(12) United States Patent
Mao (10) Patent No.: US 7,756,016 B2
(45) Date of Patent: Jul. 13, 2010

(54) METHOD AND APPARATUS FOR EFFICIENT LINK REDUNDANCY

(75) Inventor: Jim Mao, Rohnert Park, CA (US)

(73) Assignee: Force IO Networks, Inc., San Jose, CA (US)

( * ) Notice: Subject to any disclaimer, the term of this patent is extended or adjusted under 35 U.S.C. 154(b) by 753 days.

(21) Appl. No.: 11/340,063

(22) Filed: Jan. 25, 2006

(65) Prior Publication Data

US 2006/0209905 A1 Sep. 21, 2006

Related U.S. Application Data (63) Continuation of application No. 09/745,689, filed on Dec. 22, 2000, now Pat. No. 7,050,391.

(51) Int. Cl.
G01R 31/08 (2006.01)

(52) U.S. Cl. ............................ 370/222; 370/537; 398/50

(58) Field of Classification Search ......... 370/216–218, 370/252–254, 907, 468, 532–544; 375/366, 375/368; 709/236, 238, 245; 398/47, 50, 398/56, 79
See application file for complete search history.

(56) References Cited

U.S. PATENT DOCUMENTS

| | | | | |
|---|---|---|---|---|
| 5,005,166 A * | 4/1991 | Suzuki et al. | ............... | 398/47 |
| 5,065,314 A | 11/1991 | Maskovyak | | |
| 5,406,401 A | 4/1995 | Kremer | | |
| 5,428,806 A | 6/1995 | Pocrass | | |
| 5,457,556 A * | 10/1995 | Shiragaki | ............... | 398/50 |
| 5,506,833 A | 4/1996 | Nemoto | | |
| 5,596,730 A | 1/1997 | Sekine | | |
| 5,615,237 A | 3/1997 | Chang et al. | | |
| 5,619,489 A | 4/1997 | Chang et al. | | |
| 5,721,727 A * | 2/1998 | Ashi et al. | ............... | 370/248 |
| 5,724,352 A | 3/1998 | Cloonan et al. | | |

(Continued)

FOREIGN PATENT DOCUMENTS

EP 0620694 A2 * 4/1994

(Continued)

OTHER PUBLICATIONS

Yuanyuan, Y., et al., "Nonblocking Broadcast Switching Networks", Sep. 1991, pp. 1005-1015, IEEE Transactions on Computers, vol. 40, No. 9.

(Continued)

Primary Examiner—Ricky Ngo
Assistant Examiner—Phuongchau B Nguyen
(74) Attorney, Agent, or Firm—Robert Schuler (57) ABSTRACT

A method that changes the selection of a 2:1 multiplexer that receives a first output signal from a first framer and a second output signal from a second framer. The first output signal is the same as the second output signal. An apparatus having a framer and a 2:1 multiplexer that receives an inbound signal from the framer. A first multiplexer receives at least one signal from another framer and the 2:1 multiplexer has an input coupled to an output from the first multiplexer. A second multiplexer receives at least one signal from the other framer and the second multiplexer has an output coupled to an input of the framer for an outbound signal.

13 Claims, 5 Drawing Sheets

U.S. PATENT DOCUMENTS

| | | | |
|---|---|---|---|
| 5,751,696 A | 5/1998 | Bechtel et al. | |
| 5,777,874 A | 7/1998 | Flood et al. | |
| 5,793,745 A * | 8/1998 | Manchester | 370/224 |
| 5,796,723 A | 8/1998 | Benchech et al. | |
| 5,815,489 A | 9/1998 | Takatori et al. | |
| 5,909,175 A * | 6/1999 | Yamasaki et al. | 370/222 |
| 6,038,678 A * | 3/2000 | Fukushima et al. | 370/244 |
| 6,101,198 A | 8/2000 | Koenig et al. | |
| 6,205,562 B1 | 3/2001 | Fukushima et al. | |
| 6,219,336 B1 | 4/2001 | Takahashi et al. | |
| 6,226,111 B1 * | 5/2001 | Chang et al. | 370/223 |
| 6,228,814 B1 | 5/2001 | Miyoji et al. | |
| 6,278,536 B1 * | 8/2001 | Kai et al. | 398/79 |
| 6,317,414 B1 | 11/2001 | Naohiro | |
| 6,317,426 B1 | 11/2001 | Afanador et al. | |
| 6,317,439 B1 | 11/2001 | Cardona et al. | |
| 6,351,452 B1 | 2/2002 | Koenig et al. | |
| 6,359,859 B1 | 3/2002 | Brolin et al. | |
| 6,606,667 B1 * | 8/2003 | Hermann | 709/239 |
| 6,647,428 B1 | 11/2003 | Bannai et al. | |
| 6,718,480 B1 | 4/2004 | Ogura et al. | |
| 6,744,769 B1 * | 6/2004 | Siu et al. | 398/79 |
| 7,050,391 B1 * | 5/2006 | Mao | 370/218 |
| 7,173,936 B1 * | 2/2007 | Semaan | 370/907 |
| 2006/0209905 A1 * | 9/2006 | Mao | 370/532 |

FOREIGN PATENT DOCUMENTS

| | | |
|---|---|---|
| EP | 0 620 694 A2 | 10/1994 |
| EP | 0 840 472 A2 | 5/1998 |
| WO | WO 98/31119 | 7/1998 |

OTHER PUBLICATIONS

Ohta, S., et al., "A Rearrangement Algorithm for Three-Stage Switching Networks", Sep. 1987, pp. 68-77, Electronics and Communications in Japan, Part 1, vol. 70, No. 9.

* cited by examiner

FIG. 1

(PRIOR ART)

METHOD AND APPARATUS FOR EFFICIENT LINK REDUNDANCY

CLAIM OF PRIORITY

This application is a continuation application and claims the priority date of co-pending U.S. patent application Ser. No. 09/745,689, filed Dec. 22, 2000, now U.S. Pat. No. 7,050, 391 entitled, "Method And Apparatus For Efficient Link Redundancy".

FIELD OF THE INVENTION

The field of invention relates to networking, generally, and, more specifically, to link redundancy.

BACKGROUND

Figure 1:
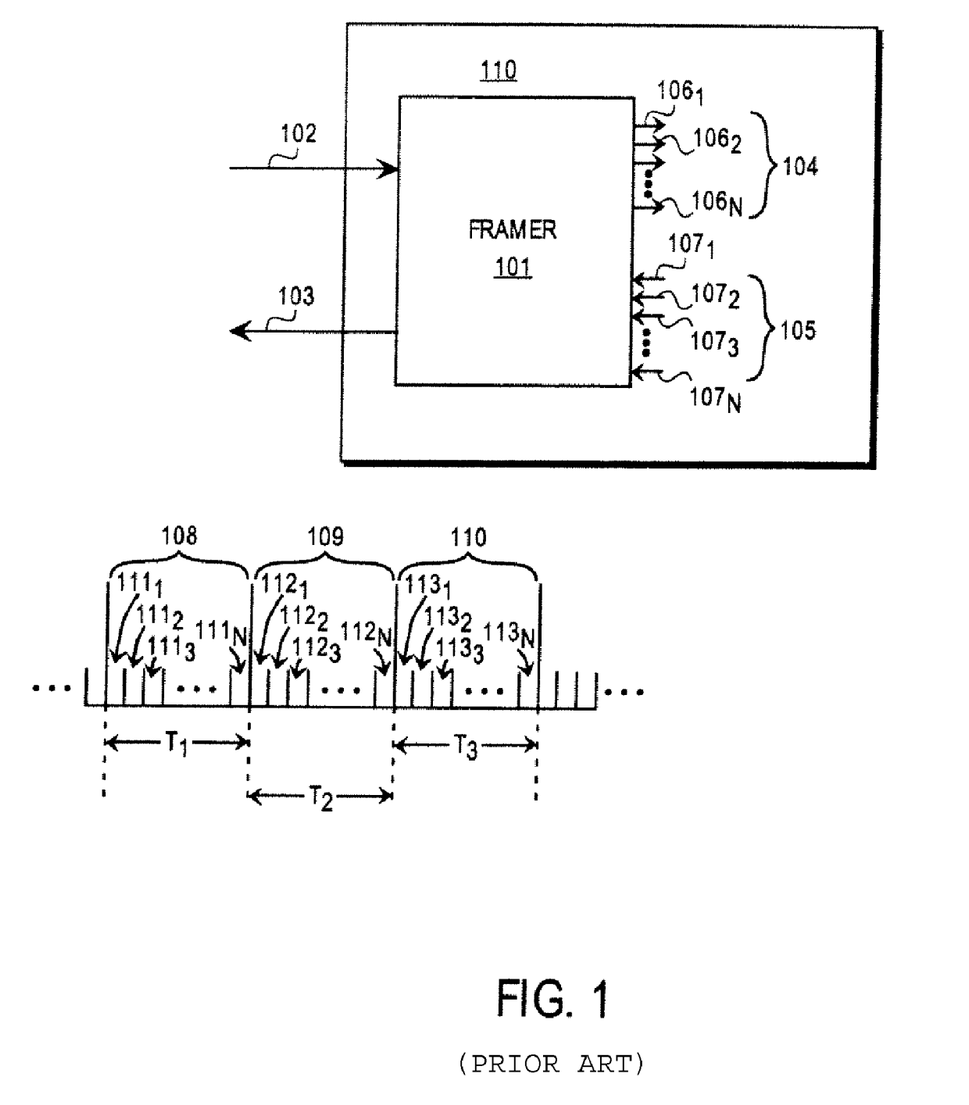
FIG. 1 shows an exemplary framer.

Framers are commonly used in networking systems. FIG. 1 illustrates an exemplary framer. A network line such as networking line 102 or networking line 103 in FIG. 1 couples a pair of networking systems (e.g., switches, routers, multiplexers, gateways, etc.) so that the pair of networking systems may communicate with one another. Examples of networking lines include fiber optic or copper cable. Note that for simplicity, physical layer devices (e.g., lasers/photo-detectors, line drivers, etc.) typically placed between the framer 101 and the networking lines are not shown in FIG. 1.

Frames (such as frames 108, 109, and 110) are used to organize the flow of information over a network line. In the case of SYNnchronous Optical Network (SONET) frames, each frame may be viewed as carrying "n" synchronous payloads envelopes (SPEs) of 810 bytes. Conceptually, as seen in FIG. 1, frame 108 carries SPEs $111_1$, $111_2$, $111_3$, ..., $111_n$; frame 109 carries SPEs $112_1$, $112_2$, $112_3$, ..., $112_n$; and frame 110 carries SPEs $113_1$, $113_2$, $113_3$, ..., $113_n$. For simplicity, note that the overhead portions of each frame 108, 109, 110 are not shown.

For SONET frames, the time consumed by each frame (e.g., time T1 for frame 108, time T2 for frame 109, and time T3 for frame 110) corresponds to 125 μs regardless of the number of SPEs carried per frame (i.e., "n"). Furthermore, the number of SPEs carried per frame remains constant from frame to frame. Thus, the number of SPEs carried per frame is indicative of the network line speed.

For example, a SONET networking line having only one SPE per frame (i.e., n=1) corresponds to a line speed of 51.840 Mbs (i.e., 810 bytes every 125 μs). Similarly, a SONET networking line having three SPEs per frame (i.e., n=3) corresponds to a line speed of 155.52 Mbs (i.e., 2430 bytes every 125 μs), a SONET networking line having forty eight SPEs per frame (i.e., n=48) corresponds to a line speed of 2.488 Gb/s (i.e., 38880 bytes every 125 μs), etc. Note that if the applicable networking line is optical "OC" is typically used instead of "STS" (e.g., OC-3, OC-48, etc.).

One SPE per 125 μs is referred to as an STS-1 signal. Thus, a 51.840 Mbs SONET networking line carries a single STS-1 signal; a 155.52 Mbs SONET networking line carries three STS-1 signals; and a 2.488 Gb/s SONET networking line carries forty eight STS-1 signals. Typically, each STS-1 signal may be viewed as corresponding to the same SPE position across different frames. That is, a first STS-1 signal corresponds to SPEs $111_1$, $112_1$, and $113_1$; a second STS-1 signal corresponds to SPEs $111_2$, $112_2$, $113_2$; etc.

FIG. 1 shows a framer within a networking system 110 that acts as a node in a network. The framer 101 in FIG. 1 is one or more semiconductor chips that provide framing organization for a network line. For example, the exemplary framer 101 of FIG. 1: 1) formats STS-1 signals into frames that are transmitted on an outbound networking line 103 to another network node; and 2) retrieves STS-1 signals from frames received from another network node on an inbound networking line 102.

In the case of outbound transmission, other portions of the framer's networking system 110 individually provide each STS-1 signal carried by the outbound network line 103 to the framer 101. For example, a first STS-1 signal is presented to the framer at input $107_1$, a second STS-1 signal is presented to the framer at input $107_2$, etc. Consequently, for example, the framer 101 maps on outbound networking line 103: the STS-1 signal received at input $107_1$, across SPE positions $111_1$, $112_1$, $113_1$; the STS-1 signal received at input $107_2$ across SPE positions $111_2$, $112_2$, $113_2$, etc.

Correspondingly, in the case of inbound transmission, each STS-1 signal carried by the inbound network line 102 is individually presented by the framer 101 to higher layers of the framer's networking node 110. For example, a first STS-1 signal mapped on SPE positions $111_1$, $112_1$, $113_1$ is presented on framer output $106_1$, a second STS-1 signal mapped on SPE positions $111_2$, $112_2$, $113_2$ is presented on framer output $106_2$, etc. The individual outbound STS-1 signals may be collectively referred to as outbound STS-1 signals 105. Similarly, the individual inbound STS-1 signals may be collectively referred to as inbound STS-1 signals 104.

Note that different types of framers may exist. In one respect, the granularity of the inbound and outbound signals 104, 105 may vary. For example, with respect to SONET framers, each of the individual signals that collectively form the inbound and outbound signals 104, 105 may be comprised of a signal that consumes less bandwidth than an STS-1 signal (e.g., down to a 64 kbps signal) or more bandwidth than an STS-1 signal (e.g., each input signal may correspond to a group of STS-1 signals such as an STS-3 rate signal or an STS-12 rate signal, or higher). In another respect, different framing formats may be applied (e.g., SDH).

SUMMARY OF INVENTION

A method that changes the selection of a 2:1 multiplexer that receives a first output signal from a first framer and a second output signal from a second framer. The first output signal is the same as the second output signal.

BRIEF DESCRIPTION OF THE DRAWINGS

The present invention is illustrated by way of example, and not limitation, in the Figures of the accompanying drawings in which.

DETAILED DESCRIPTION

A method is described that changes the selection of a 2:1 multiplexer that receives a first output signal from a first framer and a second output signal from a second framer. The first output signal is the same as the second output signal.

An apparatus is described having a framer and a 2:1 multiplexer that receives an inbound signal from the framer. A first mutliplexer receives at least one signal from another framer and the 2:1 multiplexer has an input coupled to an output from the first multiplexer. A second multiplexer receives at least one signal from the other framer and the second multiplexer has an output coupled to an input of the framer for an outbound signal.

Link redundancy is a technique for protecting against the failure of a network line. A networking line may fail for any of a number of reasons (e.g., the line itself may be opened, the aforementioned physical layer devices mail fail, etc.). As such, networking service providers and networking system providers are interested in technology that allows for such failures without disrupting the operation of a network.

Link redundancy is the notion that a "spare" network line may be installed into the network for the purpose of carrying another network line's traffic should the other network line fail. That is, if a network line fails, the network "switches over" to the spare network line in order to avoid significant disruption of the network.

Figure 2:
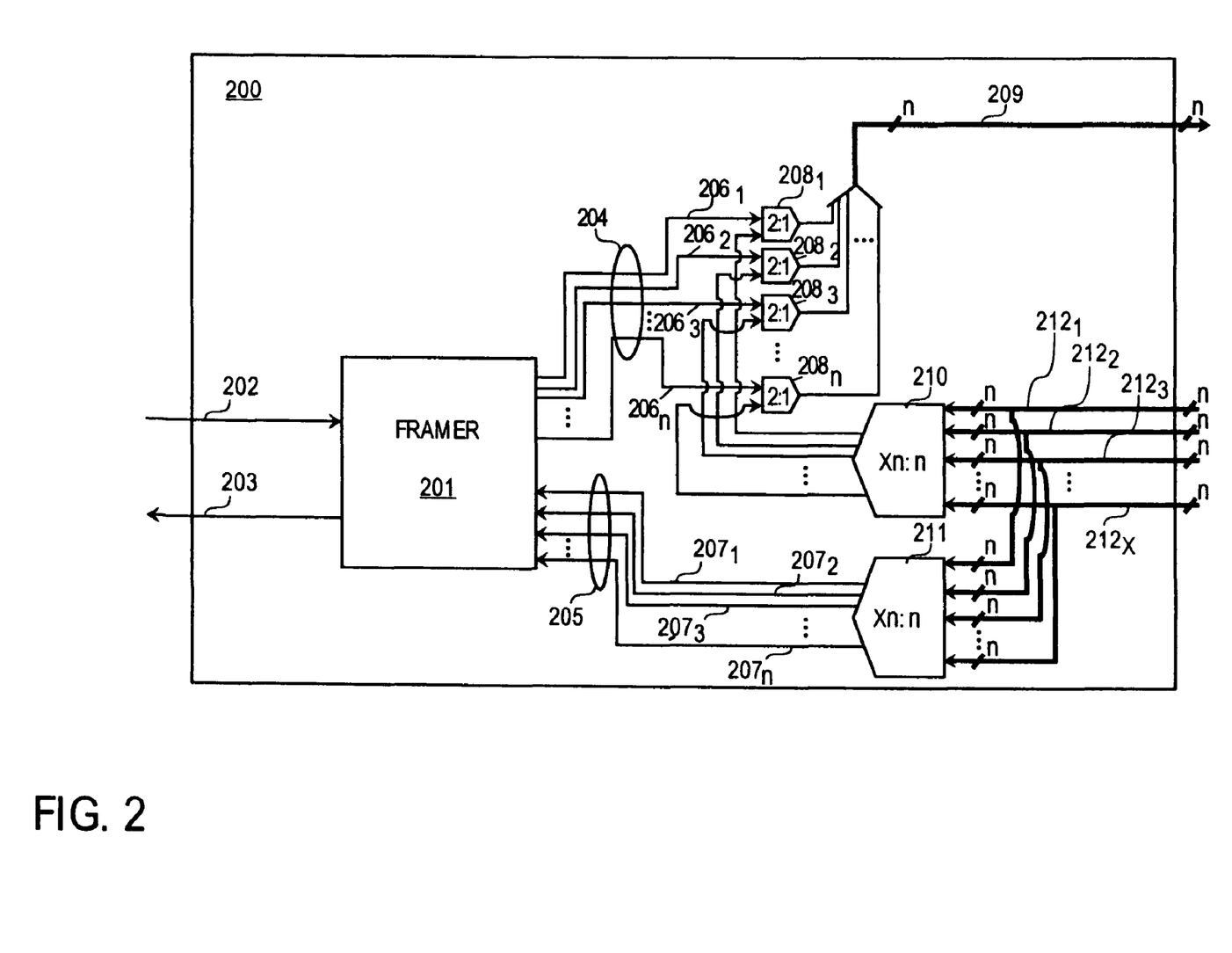
FIG. 2 shows an exemplary framer logic unit.

FIG. 2 shows an exemplary framer logic unit 200. The exemplary framer logic unit 200 of FIG. 2 provides for efficient link redundancy, as described in more detail with respect to FIGS. 3 and 4. Before discussing how the architecture of the framer logic unit 200 of FIG. 2 provides for efficient link redundancy implementation, however, the design of the framer logic unit 200 will first be discussed.

A framer 201 is shown coupled to an inbound networking line 202 and an outbound networking line 203. The framer 201 also provides inbound signals 204 from the inbound networking line 202 and receives outbound signals 205 for transmission over outbound networking line 203. In an embodiment, each signal corresponds to an STS-1 signal; however, other framer and signal embodiments may exist as alluded to in the background above.

Each inbound signal $206_1, 206_2, 206_3, \ldots, 206_n$, is directed from the framer 201 to its own corresponding 2:1 multiplexer $208_1, 208_2, 208_3, \ldots, 208_n$. That is, as seen in FIG. 2, inbound signal $206_1$, is directed to 2:1 multiplexer $208_1$; inbound signal $206_2$ is directed to 2:1 multiplexer $208_2$, etc. The output of the framer logic unit 200 corresponds to the collective output 209 of each of the 2:1 multiplexers $208_1, 208_2, 208_3, \ldots, 208_n$. Note that "n", as described in the background, in an embodiment, may correspond to each STS-1 signal carried per frame. Thus, for example, in an embodiment there is forty eight 2:1 multiplexers for a framer 201 that corresponds to an OC-48 framer (i.e., n=48).

The framer logic unit output 209 may be viewed as a bus that collects each 2:1 multiplexer output. The framer logic unit 200 may be viewed as an architectural building block for a networking system. In such an application, the framer logic unit output 209 may be directed to every other framer logic unit in the system. That is, the architecture of the system may be designed to have multiple framer logic units (e.g., one framer logic unit 200 per inbound/outbound line pair coupled to the system).

As such, the framer logic unit 200 is designed to communicate with other framer logic units within the same system. For example, in an embodiment, framer logic unit 200 corresponds to a line interface card (LIC) that plugs into the backplane of a switch. In this case, the framer logic unit output 209 corresponds to a LIC output 209 that may be routed (through a backplane) to every other LIC in the system having the same (or similar) framer logic unit 200 design seen in FIG. 2.

As such, the framer logic unit 200 is also designed to receive each output from the other framer logic units in the system. Thus, for a system having "x" other framer logic units, framer logic unit 200 receives "x" inputs $212_1, 212_2, 212_3, \ldots, 212_x$. Thus, each input $212_1, 212_2, 212_3, \ldots, 212_x$ corresponds to the output bus (similar to output 209) of another framer logic unit in the system.

Combining each input $212_1, 212_2, 212_3, \ldots, 212_x$ together corresponds to a total input of "xn" signals. That is, in this particular embodiment, as each input has n signals and as there are x inputs, the total number of signals presented to the framer logic unit 200 corresponds to "xn". The "xn" group of input signals are directed to a pair of (xn):n multiplexers 210, 211. Each (xn):n multiplexer 210, 211 selects "n" of the "xn" input signals.

Each of the 2:1 multiplexers $208_1, 208_2, 208_3, \ldots, 208_n$ receives one of the n outputs from the first (xn):n multiplexer 210. As described in more detail below with respect to FIGS. 3 and 4, the architectural arrangement of the first (xn):n multiplexer 210 feeding each of the 2:1 multiplexers $208_1, 208_2, 208_3, \ldots, 208_n$ helps provide for efficient link redundancy.

The output of the second (xn):n multiplexer 211 corresponds to outbound signals 205 that are transported over the outbound networking line 203. Note that the second multiplexer 211 may be used to establish the switching fabric of the networking system. That is, as the output signals of every framer logic unit may be presented to the second multiplexer 211, any input signal can be directed to the input of framer 201. As every framer logic unit may receive the output of the other framer logic units within the system, an entire switching fabric for a networking system may be established by configuring the selection of particular output signals from each (xn):n multiplexer that feeds input signals to a framer.

Figure 3:
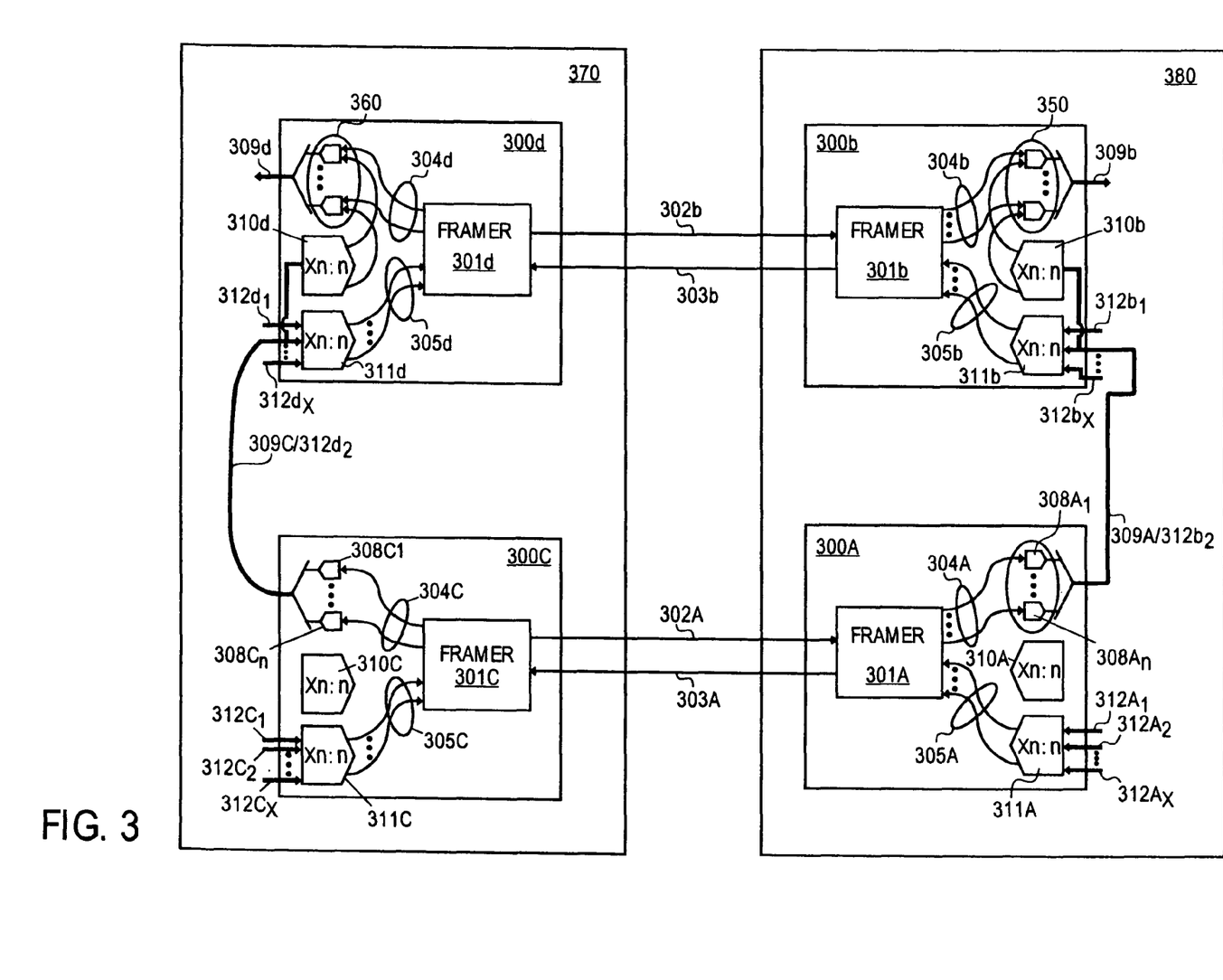
FIG. 3 shows a 1+1 FFP PG or UPSR redundancy scheme that employs the exemplary framer logic unit of FIG. 2.

FIG. 3 shows a 1+1 Fiber Facility Protection (FFP) or Unidirectional Path Switched Ring (UPSR) redundancy scheme that employs the exemplary framer logic unit of FIG. 2. Under a 1+1 FFP redundancy scheme or a UPSR redundancy scheme, a "working" pair of networking lines (e.g., networking line pair 302a, 303a) are considered the primary networking lines used for communication between the pair of nodes 370, 380 that are coupled by the pair. Should the working pair of networking lines 302a, 303a fail, however, a "protection" pair of networking lines 302b, 303b are enabled.

A networking system built with framer logic units 200 as discussed above allows for efficient 1+1 FFP or UPSR redundancy because redundancy "hooks" are built into the framer logic unit design. Specifically, note that FIG. 3 shows a first node 370 and a second node 380 that are each constructed with the framer logic units 300a, 300b, 300c, and 300d as described above with respect to FIG. 2.

Networking system 370 includes framer logic units 300c and 300d while networking system 380 includes framer logic units 300a and 300b. Note that the framer logic units within the same system are coupled as described above with respect to FIG. 2. That is, the output 309a of framer logic unit 300a is shown coupled to an input $312b_2$ of framer logic unit 300b. Similarly, the output 309c of framer logic unit 300c is shown coupled to an input $312d_2$ of framer logic unit 300d.

Note that the output 309b of framer logic unit 300b may be coupled to an input of framer logic unit 300a and the output 309d of framer logic unit 300d may be coupled to an input of framer logic unit 300c; however, for ease of drawing, these couplings are not shown in FIG. 3. Within the first networking system 370, the second (xn):n multiplexers 311c, 311d of each framer logic unit 300c, 300d are identically configured. That is, both (xn):n multiplexers 311c, 311d present the same collection of signals to each of their respective framers 301c, 301d. As such, networking lines 302a, 302b are configured to send the same information from system 370 to system 380. Similarly, within the second networking system 380, the second (xn):n multiplexers 311$a$, 311$b$ of each framer logic unit 300$a$, 300$b$ are identically configured such that the same information is sent from system 380 to system 370 over networking lines 303$a$ and 303$b$.

The output of framer logic units 300$a$ and 300$c$ correspond to the inbound signals 304$a$, 304$c$ from framers 301$a$ and 301$c$, respectively. That is, the 2:1 multiplexers 308$a_1$, through 308$a_x$ of framer logic unit 300$a$ are configured to select the framer 301$a$ inbound signals 304$a$ rather than the output signals from the first multiplexer 310$a$. Similarly, the 2:1 multiplexers 308$c_1$, through 308$c_x$ of framer logic unit 300$c$ are configured to select the framer 301$c$ inbound signals 304$c$ rather than the output signals from the first multiplexer 310$c$.

The first (xn):n multiplexer 310$b$ within framer logic unit 300$b$ is configured to select the output signals from framer logic unit 300$a$. Also, the first (xn):n multiplexer 310$d$ within framer logic unit 300$d$ is configured to select the output signals from framer logic unit 300$b$. As such, first multiplexer 310$b$ effectively presents framer 301$a$ inbound signals 304$a$ to the 2:1 multiplexers 350 within framer logic unit 300$b$; and first multiplexer 310$d$ effectively presents framer 301$c$ inbound signals 304$c$ to the 2:1 multiplexers 360 within framer logic unit 300$d$.

The 2:1 multiplexers 350, 360 of frame logic units 300$b$, 300$c$ also receive the inbound signals 304$b$, 304$d$ from their respective framers 301$b$, 301$d$. As such, the 2:1 multiplexers 350 receive the inbound signals 304$b$ from framer 301$b$ at one channel input as well as receive the inbound signals 304$a$ from framer 301$a$ at the other channel input. Similarly, the 2:1 multiplexers 360 receive the inbound signals 304$d$ from framer 301$d$ at one channel input as well as receive the inbound signals 304$c$ from framer 301$c$ at the other channel input.

Because networking lines 302$a$ and 302$b$ send the same information as discussed above, the 2:1 multiplexers 350 within framer logic unit 300$b$ effectively receives the same information at both channel inputs. Similarly, because networking lines 303$a$ and 303$b$ send the same information as discussed above, the 2:1 multiplexers 360 within framer logic unit 300$d$ effectively receive the same information at both channel inputs.

As such, the 2:1 multiplexers 350, 360 may easily toggle from the working networking line pair 302$a$, 303$a$ to the protection networking line pair 302$b$, 303$b$ if the working networking line pair 302$a$, 303$a$ should fail. Specifically, during normal "working" mode, the 2:1 multiplexers 350, 360 are respectively configured to enable the inbound signals 304$a$, 304$c$ received from framers 301$a$, 301$c$. If a failure is detected on networking line pair 302$a$, 303$a$ the selection performed by the 2:1 multiplexers 350, 360 is toggled to produce the inbound signals 304$b$, 304$d$ from the framers 301$b$, 301$d$ at output 309$b$ and 309$d$ (rather the inbound signals 304$a$, 304$c$ from framers 301$a$, 301$c$).

Thus, regardless as to which network line pair is actually used, the output 309$b$, 309$d$ from framer logic units 300$b$, 300$d$ are "looked to" by the networking system 380, 370 to as the source of information from the other networking system 370, 380. As such, either networking system 370, 380 does not experience significant disruption.

Figure 4:
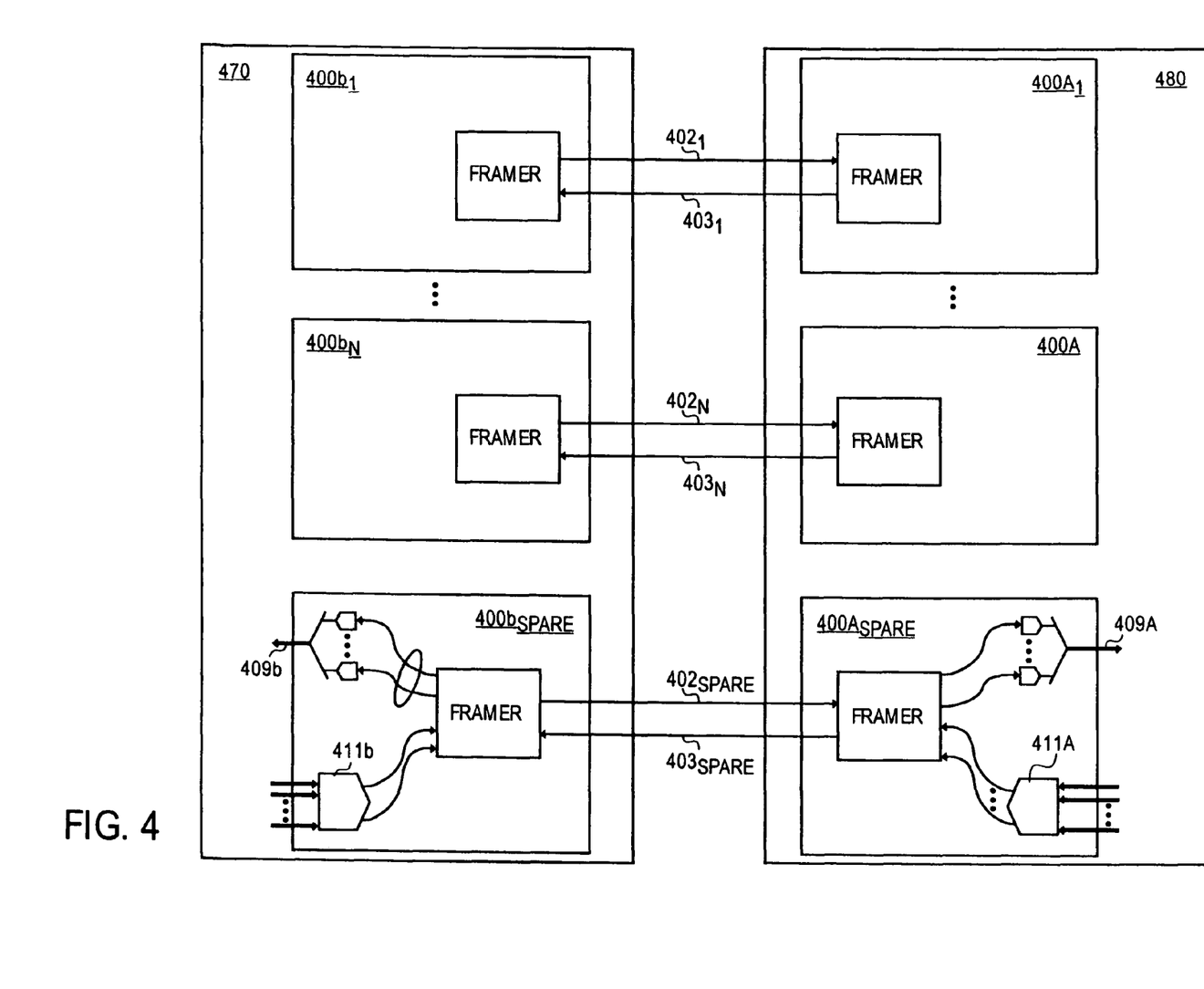
FIG. 4 shows an example of 1:N redundancy or 1:1 BLSR redundancy implemented with the framer logic unit 200 shown in FIG. 2.

FIG. 4 shows an example of 1:N redundancy or 1:1 Bidirectional Line Switched Ring (BLSR) redundancy implemented with the framer logic unit 200 shown in FIG. 2. In either approach, a spare networking line pair 402$_{spare}$, 403$_{spare}$ replaces any networking line pair that fails within a group of networking line pairs 402$_1$ through 402$_N$, 403$_1$, through 403$_N$. Note that the framer logic units 400$a_1$ through 400$a_N$, 400$a_{spare}$ and framer logic units 400$b_1$ through 400$b_N$, 400$b_{spare}$ each correspond to the framer logic unit design 200 of FIG. 2.

In the approach of FIG. 4, when a particular line pair within the protected group (402$_1$, through 402$_N$, 403$_1$, through 403$_N$) fails, the second (xn):n multiplexer 411$a$, 411$b$ within each spare framer logic unit 400$a$, 400$b$ are configured to select the outbound signals 305$a$, 305$b$ that were sent over the failed networking line pair. Thus, for example, if networking line pair 402$_1$, 403$_1$ fails, the signals selected for transmission over networking line 403$_1$ are presented to framer 401$a_{spare}$ for transmission over networking line 403$_{spare}$. Similarly, the signals selected for transmission over networking line 402$_1$, are presented to framer 401$b_{spare}$ for transmission over networking line 402$_{spare}$. The 2:1 multiplexers of the spare framer logic units 400$a_{spare}$, 400$b_{spare}$ are configured to select the outbound signals from their respective framers 401$a_{spare}$, 401$b_{spare}$.

Figure 5:
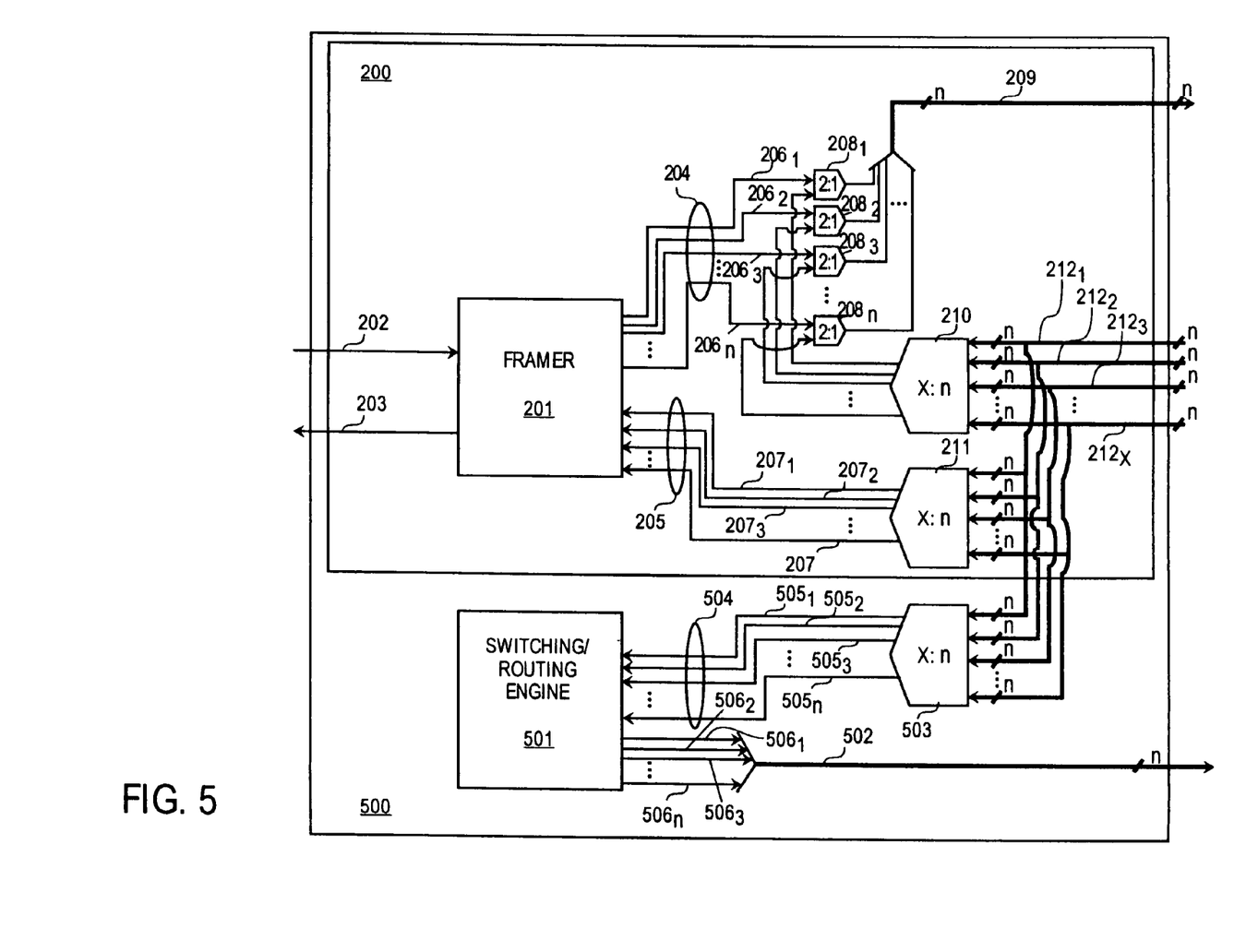
FIG. 5 shows the exemplary framer logic unit of FIG. 2 further including a switching or routing extension.

FIG. 5 shows another framer logic unit embodiment 500 that may be viewed as the framer logic unit 200 of FIG. 2 further including a switching or routing extension 501. The inputs 212$_1$, 212$_2$, 212$_3$, ..., 212$_x$ to the framer logic unit 500 are coupled to a third (xn):n multiplexer 503 that may select any inbound signal for switching or routing. Routing or switching engine 501 provides packet based (e.g., Internet Protocol (IP) based) switching (e.g., label switching) or routing. The routing or switching engine 502 may be a logic circuit; or a processor that executes software consistent with the routing or switching protocol(s) to be employed; or a combination of logic and processor.

The routing or switching engine 502 assembles packets from the signals 505$_1$, 505$_2$, 505$_3$, ..., 505$_n$ selected by a third (xn):n multiplexer 503. Based on the destination of a packet (e.g., as indicated in the packet's header), the routing or switching engine 502 determines an appropriate outbound signal 506$_1$, 506$_2$, 506$_3$, ..., 506$_n$ that the packet should be forwarded to. The packet is then disassembled and sent over the appropriate outbound signal. Note that a second framer logic unit output 502 may be viewed as a bus having each of the switching or routing engine output signals 506$_1$, 506$_2$, 506$_3$, ..., 506$_n$.

In an embodiment, framer output logic output 502 is sent to every other framer logic unit in the networking system. As such the networking system can be configured to provide packet based routing or switching between any of the n inbound signals 505$_1$, 505$_2$, 505$_3$, ..., 505$_n$ selected by the third (xn):n multiplexer 503 and any of the "n" outbound signals 506$_1$, 506$_2$, 506$_3$, ..., 506$_n$ within the networking system.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

For example, even though the above description has described a networking system where every framer logic unit 200 couples "n" signals to a framer 201 and every first 210, second 211, and third 503 multiplexers correspond to a (xn):n multiplexer, other embodiments may be realized that deviate from this architecture.

For example, framer logic units within the same networking system may couple different amounts of signals to their respective framer (e.g., some framer logic units may couple "n" signals to their respective framer while other framer logic units may couple more than (or less than) "n" signals to their respective framer. For example, a framer logic unit coupled to a pair of higher speed networking lines may present more signals to its respective framer than a framer logic unit coupled to a pair of lower speed networking lines.

Furthermore a framer logic unit does not necessarily need to receive (at first 210, second 211, and third 503 multiplexers) every inbound signal in the system. As such, in light of the comments above, first 210, second 211, and third 503 multiplexers may exhibit a varied selection ratio from framer logic unit to framer logic unit. That is, some selection ratios within a networking system may be configured at (xn):n. However, selection ratios other than (xn):n may exist within the same system. As such, the routing or switching engine 501 may switch or route packets from/to more than n signals or from/to less than n signals.

What is claimed is:

1. An ingress and egress channel for a networking system, comprising:
  a) a framer to receive an ingress frame and send an egress frame, said framer having separate outputs for separate ingress signals within said ingress frame, said framer having separate inputs for separate egress signals within said egress frame;
  b) separate ingress multiplexers for each of said outputs, each ingress multiplexer having a first input coupled to a different one of said outputs;
  c) separate egress multiplexers for each of said inputs of said framer, each egress multiplexer having an output coupled to a different one of said inputs of said framer, each egress multiplexer having inputs to receive ingress signals from other ingress and egress channels within said networking system: and,
  d) separate additional multiplexers for each second input of said ingress multiplexers, each additional multiplexer having an output coupled to a different ingress multiplexer's second input, each additional multiplexer having inputs to receive additional ingress signals received by said networking system that are the same as said ingress signals.

2. The ingress and egress channel of claim 1 wherein said signals are STS signals.

3. The ingress and egress channel of claim 1 wherein said ingress and egress channel is implemented on a semiconductor chip.

4. The ingress and egress channel of claim 1 wherein said egress multiplexers' inputs are the same as said additional multiplexers' inputs.

5. The ingress and egress channel of claim 1 further comprising a switching/routing engine having inputs coupled to receive said ingress signals from said other ingress or egress channels.

6. The ingress and egress channel of claim 5 wherein said switching/routing engine is an IP switching/routing engine.

7. A networking system, comprising:
  a first ingress and egress channel, a second ingress and egress channel and a third egress channel, said first ingress and egress channel having:
  a) a framer to receive an ingress frame and send an egress frame, said framer having separate outputs for separate ingress signals within said ingress frame, said framer having separate inputs for separate egress signals within said egress frame;
  b) separate ingress multiplexers for each of said outputs, each ingress multiplexer having a first input coupled to a different one of said outputs;
  c) separate egress multiplexers for each of said inputs of said framer, each egress multiplexer having an output coupled to a different one of said inputs of said framer, each egress multiplexer having inputs to receive ingress signals from said second ingress and egress channel; and,
  d) separate additional multiplexers for each second input of said ingress multiplexers, each additional multiplexer having an output coupled to a different ingress multiplexer's second input, each additional multiplexer having inputs to receive said ingress signals from another frame received by said third ingress and egress channel.

8. The networking system of claim 7 wherein said second and third ingress and egress channels are the same ingress and egress channel.

9. The networking system of claim 7 wherein said second ingress and egress channel comprises:
  a) a second framer to receive a second ingress frame and send a second egress frame, said second framer having separate outputs for separate ingress signals within said second ingress frame, said second framer having separate inputs for separate egress signals within said second egress frame;
  b) separate second ingress multiplexers for each of said outputs of said second framer, each second ingress multiplexer having a first input coupled to a different one of said second framer outputs;
  c) separate second egress multiplexers for each of said inputs of said second framer, each second egress multiplexer having an output coupled to a different one of said inputs of said second framer, each second egress multiplexer having inputs to receive ingress signals from said separate ingress multiplexers.

10. The networking system of claim 9 wherein said networking system is configurable to implement a 1+1 protection scheme.

11. The networking system of claim 9 wherein said networking system is configurable to implement a UPSR protection scheme.

12. The networking system of claim 9 wherein said networking system is configurable to implement a BLSR protection scheme.

13. The networking system of claim 7 wherein said ingress and egress channel further comprises a switching/routing engine having inputs coupled to receive said ingress signals from second ingress and egress channel.

* * * * *